United States Patent
Gong et al.

(10) Patent No.: US 8,243,623 B2
(45) Date of Patent: Aug. 14, 2012

(54) COMBINED DEVICE AND SERVICE DISCOVERY TECHNIQUE IN STATIONS SUPPORTING TUNNELED DIRECT LINK SETUP (TDLS)

(75) Inventors: Xiaohong Gong, Sunnyvale, CA (US); Victor B. Lortz, Beaverton, OR (US); Tsung-Yuan Charles Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 648 days.

(21) Appl. No.: 12/415,636

(22) Filed: Mar. 31, 2009

(65) Prior Publication Data

US 2010/0246502 A1 Sep. 30, 2010

(51) Int. Cl.
*G06F 15/177* (2006.01)
(52) U.S. Cl. .......................................... 370/254; 709/220
(58) Field of Classification Search .................. None
See application file for complete search history.

(56) References Cited

U.S. PATENT DOCUMENTS

| | | | |
|---|---|---|---|
| 7,545,811 B2 * | 6/2009 | Taha | 370/392 |
| 7,639,656 B2 * | 12/2009 | Dooley et al. | 370/338 |
| 7,886,354 B2 * | 2/2011 | Volpano | 726/15 |
| 2003/0058853 A1 * | 3/2003 | Gorbatov et al. | 370/389 |
| 2005/0138173 A1 | 6/2005 | Ha et al. | |
| 2006/0239209 A1 | 10/2006 | Ayyagari et al. | |
| 2009/0023393 A1 | 1/2009 | Behzad et al. | |
| 2009/0073945 A1 * | 3/2009 | Seok | 370/338 |
| 2009/0080388 A1 * | 3/2009 | Rohfleisch et al. | 370/338 |

OTHER PUBLICATIONS

Kim, Kwang Sik, "International Search Report and the Written Opinion", Patent Cooperation Treaty, International application No. PCT/US2010/026597, Sep. 28, 2010, 10 pages, Korean Intellectual Property Office, Daejeon, Republic of Korea.
International Preliminary Report on Patentability for PCT Patent Application No. PCT/US2010/026597 Mailed Oct. 13, 2011, 7 pages.

* cited by examiner

*Primary Examiner* — Kwang B Yao
*Assistant Examiner* — Alex Skripnikov
(74) *Attorney, Agent, or Firm* — Sutherland Asbill & Brennan LLP

(57) ABSTRACT

A tunneled direct link set-up (TDLS) capable wireless network may comprise a router such as an access point (AP) and a plurality of stations (STA) including service consumer and service provider station. A service consumer station may generate and send a layer-2 query frame to the plurality of stations. A service provider station may generate a layer-2 service frame in response to receiving the layer-2 query frame. The service consumer station may discover the service provider station and the services offered by the service provider station based on the layer-2 service frame. Also, the service consumer may discover the service provider station using layer-2 query frame and may discover the services offered by the service provider station using higher layer service discovery procedure.

14 Claims, 5 Drawing Sheets

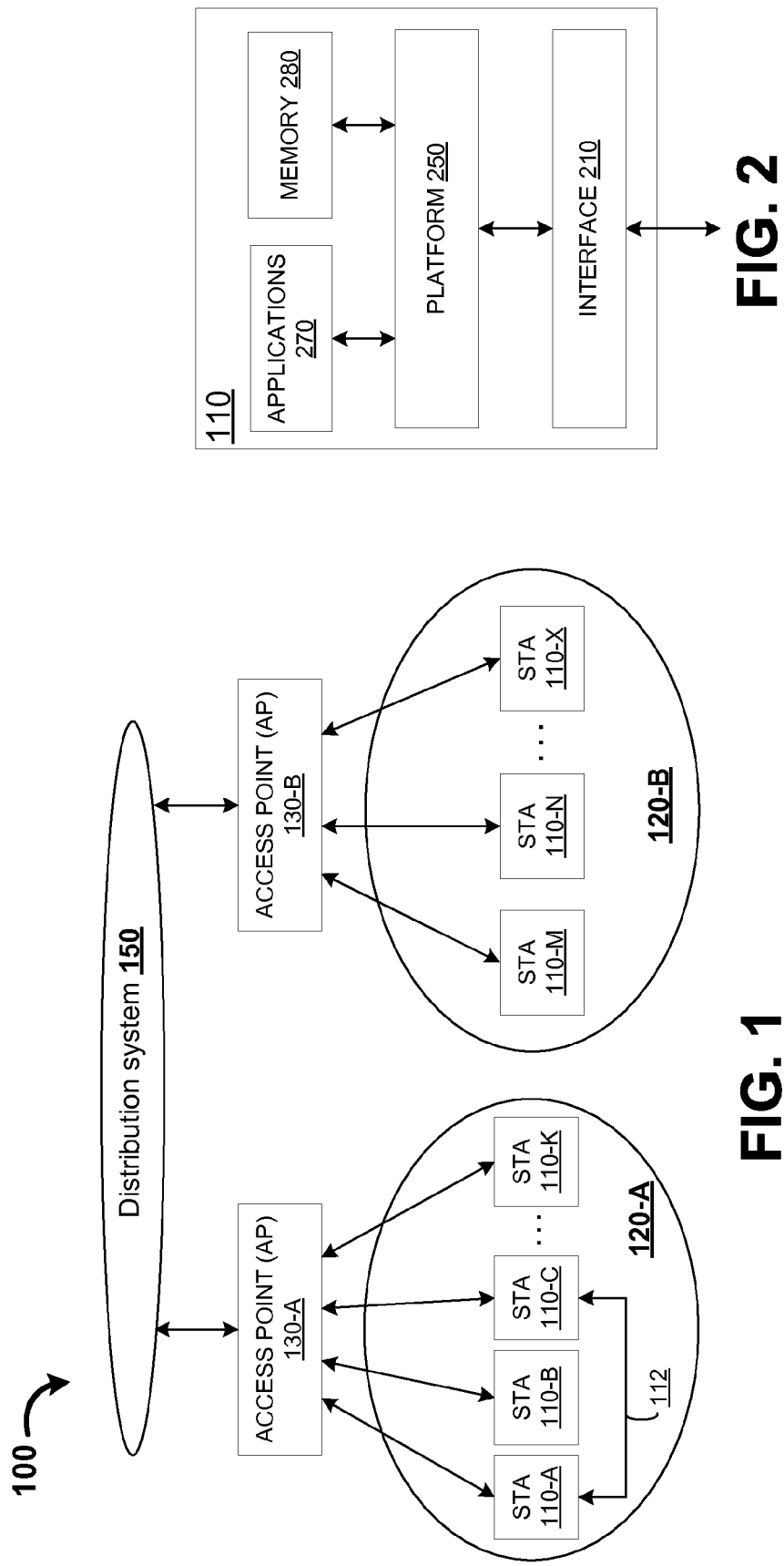

COMBINED DEVICE AND SERVICE DISCOVERY TECHNIQUE IN STATIONS SUPPORTING TUNNELED DIRECT LINK SETUP (TDLS)

BACKGROUND

A wireless network may comprise one or more basic service set (BSS) and the basic service sets (BSS) may be coupled to each other by a backbone. A basic service set may comprise stations (STA) and an access point (AP), which may be coupled to the backbone to provide an interface between the STAs within the BSS and the backbone. The stations within a BSS may be coupled to an AP of that BSS and the coupling between the STAs and the AP may be referred to as an AP path. Some mobile stations (service provider stations) of a BSS may provide, for example, print, fax, voice over IP (VoIP), multi-media, and such other services. Some other stations (service consumer STA) may use the services offered by the service provider STA. The service consumer STAs may use a higher layer discovery protocol such as UPnP or Zero-Conf to discover service provider STAs. After completion of the discovery, the service consumer STA and the service provider STA may use the AP path to transmit data units.

However, in many usage scenarios, the service consumer STA and the service provider STA may lie within each other's radio range and may be associated with a same AP. If the service consumer and service provider STA operate in a promiscuous mode for some time while exchanging the data units, the service consumer and service provider STAs may discover that they are in the same BSS and may establish a direct link for exchanging data units. However, the higher layer based discovery procedure may incur higher overhead and latency and the power consumed by the STAs while operating in promiscuous mode is significantly higher than that consumed in a normal mode. Also, switching transmission of data from AP path to the direct link may require packet losses and reordering and the switch over may cause delay/jitter.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates a wireless network environment 100, which includes an efficient combined device and service discovery technique according to one embodiment.

FIG. 2 illustrates a station (STA), which may use combined device and service discovery technique according to one embodiment.

DETAILED DESCRIPTION

Figure 4:
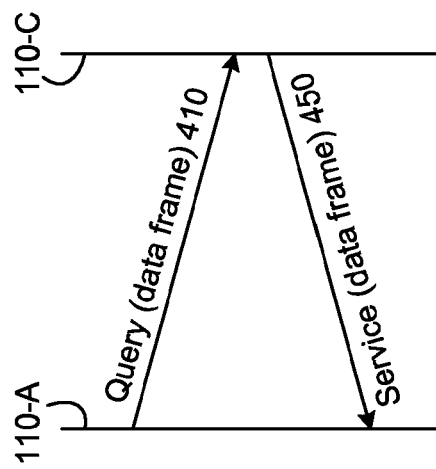
FIG. 4 illustrates frames exchanged between the service consumer STA and the service provider STA to perform combined device and service discovery according to one embodiment.

The following description describes embodiments of a technique to perform combined device and service discovery in stations (STA) supporting TDLS. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

An embodiment of a wireless network 100, which may support combined device and service discovery techniques in stations supporting TDLS is illustrated in FIG. 1. In one embodiment, the wireless network 100 may comprise an extended service set (ESS), which may include basic service sets 120-A and 120-B, access points AP 130-A and 130-B, and a distribution system 150. In other embodiment, the wireless network 100 may comprise an independent basic service set (IBSS).

In one embodiment, the distribution hub 150 may include interfaces, which may enable the STAs 110-A to 110-K in BSS 120-A to be coupled to STAs 110-M to 110-X in BSS 120-B and may couple STAs 110 in BSS 120-A and 120-B with other types of distribution networks such as Ethernet based networks. In one embodiment, the distribution hub 150 may support interoperability between the STAs 110 and devices coupled to other type of distribution networks. In one embodiment, the distribution hub 150 may support APs 130-A and 130-2.

In one embodiment, the service consumer and the service provider stations may use 1) layer-2 combined device and service discovery procedure or 2) a combination of layer-2 device discovery with higher level service discovery procedure.

While using the layer-2 combined device and service discovery procedure, in one embodiment, the service consumer station STA 110-A, which is ready to utilize a service may generate a query frame. In one embodiment, the STA 110-A may generate a broadcast query frame and encapsulate the broadcast query frame in a data frame. In one embodiment, the STA 110-A may, directly, broadcast the broadcast query frame. In one embodiment, the STA 110-A may configure the specific field (ToDS/From DS field) to a first logic value. In one embodiment, the broadcast query frame may also comprise other fields such as the BSSID (i.e., identifier of the BSS 120-A in which the STA 110-A is provisioned) field, protocol type field, service discovery related optional fields.

In other embodiment, the STA 110-A may generate a unicast query frame and send the unicast query frame to the AP 130-A. In one embodiment, the STA 110-A may configure the specific field to a second logic value and the other fields such as the destination address (DA) field to the broadcast address. In one embodiment, the unicast query frame may also comprise other fields such as the BSSID (i.e., identifier of the BSS 120-A in which the STA 110-A is provisioned) field, protocol type field, service discovery related optional fields.

In one embodiment, the service consumer station STA 110-A may receive a first service frame in response to sending the broadcast query frame and a second service frame in response to sending the unicast query frame. In one embodiment, the STA 110-A may use the information (BSSID and optional information elements (IE) fields, for example) in the first service frame to determine the BSS in which the service provider station (STA 110-C) may be provisioned and the services the STA 110-C may provide. In one embodiment, the STA 110-A may establish a direct link if the service provider station is provisioned within the same BSS as that of the STA 110-A. In one embodiment, the service consumer station STA 110-A may discover STA 110-C as the service provider station and STA 110-C may be provisioned within the same BSS 120-A as that of the STA 110-A. In one embodiment, the STA 110-A may establish a direct link 112 with the service provider station STA 110-C.

While using the layer-2 device discovery procedure combined with higher layer service discovery procedure, the STAs 110-A to 110-K and STAs 110-M to 110-X may establish layer-2 connections with the infrastructure network. In one embodiment, the infrastructure network may comprise the APs 130-A and 130-B and the distribution hub 150. After the layer-2 connectivity is established, in one embodiment, the service consumer station STA 110-A may use the higher layer (layer-3, for example) service discovery protocols such as UPnP, Bonjour, and such other similar protocols to discover the desired services. In one embodiment, the layer-2 information such as the BSSID and the MAC (medium access control) address may be piggybacked to the end of the higher layer (layer-3) message.

In other embodiment, after the service consumer station STA 110-A discovers the desired service provider station (STA 110-C) and its MAC address, the STA 110-A may initiate a device discovery handshake. In one embodiment, the device discovery handshake may comprise a request frame encapsulated in a data frame. In one embodiment, the STA 110-A may receive a response frame, which may be used to discover the location (BSS 120-A) of the service provider station STA 110-C. After discovering the location of the service provider station STA 110-C, the STA 110-A may initiate a direct link set-up procedure to set up a direct link 112 with the STA 110-C.

In one embodiment, the AP 130-A may support transfer of frames between the STAs 110-A to 110-K of the BSS 120-A using the AP path. In one embodiment, the AP 130-A and 130-B may, respectively, couple the STAs 110-A to 110-K of the BSS 120-A and STAs 110-M to 110-X of the BSS 120-B to the distribution hub 150, which may allow transfer of frames between STAs 110-A to 110-K and 110-M to 110-X.

In one embodiment, the AP 130-A may receive a broadcast query frame, check the contents of the specific field of the broadcast query, and determine not to process the broadcast query frame if the specific field of the broadcast query equals the first logic value. In other embodiment, the AP 130-A may receive a unicast query frame and re-broadcast the unicast query frame in the extended service set comprising the BSS 120-A and 120-B if the contents of the specific field of the unicast frame equals the second logic value.

In one embodiment, the AP 130-A may receive the first or the second service frame from one or more of the service provider stations. In one embodiment, the AP 130-A may receive the first service frame from the service provider station STA 110-C. In one embodiment, the AP 130-A may check the contents of the specific field of the service frame and may determine not to process the first service frame if the contents of the specific field of the service frame equal the first logic value. In one embodiment, the contents of the specific field of the first service frame may equal the first logic value if the service frame is generated in response to the broadcast query frame. In other embodiment, the AP 130-A may receive the second service frame, check the contents of the specific field, and forward the service frame to the STA 110-A (service consumer station) if the contents of the specific field equals the second logic value. In one embodiment, the AP 130-A may retrieve the address of the STA 110-A (service consumer station) embedded in a data address (DA) field of the second service frame before transferring the service frame to the STA 110-A.

While using the layer-2 combined device and service discovery procedure, in one embodiment, the STAs 110-B to 110-K and 110-M to 110-X may receive the broadcast query frame and a service provider station (e.g., STA 110-C) may respond to the broadcast query frame by generating the first or the second service frame. In one embodiment, the STA 110-C may generate the first service frame with the contents of the specific field set to the first logic value in response to receiving the broadcast query frame. In one embodiment, the other fields of the first service frame may include the BSSID (identifier of the BSS in which the STA 110-C is provisioned) field and optional IE field, which may comprise a list of services offered by the STA 110-C.

In other embodiment, the STA 110-C may generate the second service frame in response to receiving the unicast query frame. In one embodiment, the second service frame may comprise the contents of the specific field set to the second logic value and the destination address (DA) field set to the MAC address of the STA 110-A. In one embodiment, the other fields of the second service frame may include the BSSID (identifier of the BSS in which the STA 110-C is provisioned) field and optional IE field, which may comprise a list of services offered by the STA 110-C. In one embodiment, the STA 110-C may receive a request to set-up a direct link and may allow a direct link 112 to be set up between the STAs 110-C and 110-A.

While using the layer-2 device discovery procedure combined with higher layer service discovery procedure, the STA 110-C may establish layer-2 connections with the infrastructure network (AP 130-A). After the layer-2 connectivity is established, in one embodiment, the STA 110-C may receive the higher layer (layer-3, for example) service discovery protocol message based on UPnP, Bonjour, and such other similar protocols. In one embodiment, the STA 110-C may receive the layer-2 information such as the BSSID and the MAC (medium access control) address piggybacked to the end of the higher layer (layer-3) message.

In other embodiment, after discovery phase, the STA 110-C may receive device discovery handshake signals from the STA 110-A. In one embodiment, the STA 110-C may generate a response frame and send the response frame to the STA 110-A. In one embodiment, the response frame may enable discovery of the location of the STA 110-C. After discovery of the location of the service provider station, STA 110-C may initiate a direct link set-up procedure to set-up a direct link 112 with the STA 110-A.

An embodiment of a station STA 110 supporting combined device and service discovery procedure is illustrated in FIG. 2. In one embodiment, the STA 110 may comprise an interface 210, platform 250, applications 270, and memory 280. In one embodiment, the interface 210 may couple the STA 110 to a access point such as the AP 130-A or 130-B. In one embodiment, the interface 310 may provide electrical, wireless, and protocol interface between the STA 110 and the AP 130.

Figure 3:
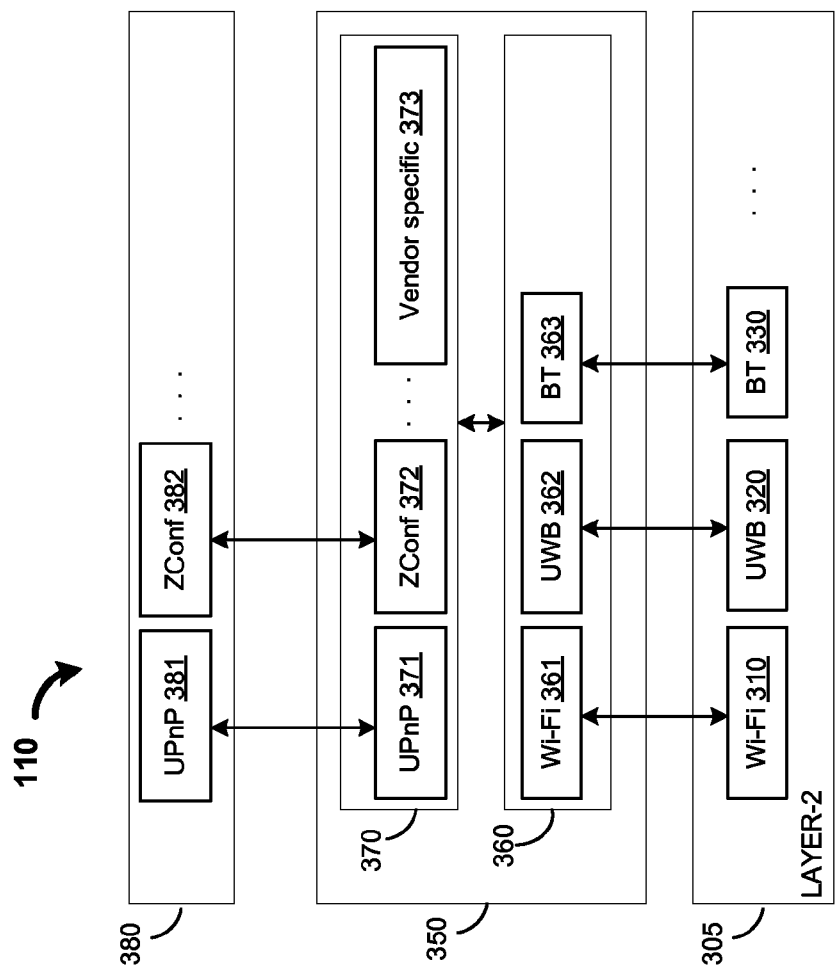
FIG. 3 illustrates a layered approach of the station STA to support combined device and service discovery technique according to one embodiment.

In one embodiment, the platform 250 may comprise hardware components such as processors, network interfaces, storage area, and such other components to support a layered model depicted in FIG. 3. In one embodiment, the platform 250 may support applications 270 and the memory 280. In one embodiment, the platform 250 may perform applications supported by the applications block 270 and the data units so generated may be stored in the memory 280.

In one embodiment, the platform 250 may generate query frames such as the broadcast query and unicast query, receive the first or second service frames, and process the service frames to perform combined device and service discovery procedure. In one embodiment, the platform 250 may also direct link set-up procedure between the service consumer station and the service provider station. In one embodiment, the platform 250 may support combined device and service discovery to be performed at layer-2 of the layered model. In one embodiment, performing the combined device and service discovery at layer-2 may include using fewer and shorter messages.

In one embodiment, the layer-2 combined device and service discovery procedure may reduce overhead incurred by service discovery procedure performed at higher layer, conserve power due to absence of promiscuous mode of operation, and reduce latency jitter and packet losses.

An embodiment of the layered model supported by the platform 250 is illustrated in FIG. 3. In one embodiment, the layered model 300 may comprise a layer-2 305, a layer-2 service discovery (L2SD) layer 350, and a layer-3 380. In one embodiment, the L2SD 350 may reside between the layer-2 305 and the layer-3 380.

In one embodiment, the layer-2 305 may comprise one or more interfaces such as IEEE 802.11 based standards Wi-Fi 310, a short range and high bandwidth radio technology based ultra-wide band UWB 320, and a frequency-hopping spread spectrum (FHSS) based Bluetooth technology based BT 330. In one embodiment, the L2SD 350 may comprise a platform dependant lower sub-layer 360 and platform independent upper sub-layer 370. In one embodiment, the L2SD sub-layer 360 may comprise interfaces such as Wi-Fi 361, UWB 362, and BT 363, which may couple the interfaces Wi-Fi 310, UWB 320, and BT 330 of layer-2 305 with the upper sub-layer 370.

In one embodiment, the upper sub-layer 370 may comprise interfaces such as Universal Plug and Play interface UPnP 371, ZConf372, and other vendor specific interfaces 373. In one embodiment, the UPnP 371 may allow devices to connect seamlessly and to simplify the implementation of networks in home and corporate environments for simplified installation of computer components. In one embodiment, the UPnP 371 may use internet-based communication standards. In one embodiment, the layer-3 380 may also comprise UPnP 381, ZConf 382, and such other interfaces to couple the layer-3 380 to the layer-2 305.

In one embodiment, the L2SD upper sub-layer 370 may receive layer-3 service discovery (L3SD) information from the Layer-3 380 and may map the L3SD information to the L2SD specific information elements. In one embodiment, the L2SD upper sub-layer 370 may compile the related L2SD information elements and send the compiled L2SD information elements to the L2SD lower sub-layer 360. In one embodiment, the L2SD lower sub-layer 360 may insert L2SD information elements (IEs) into appropriate L2 frames based on the chosen network interfaces such as the Wi-Fi 310, UWB 320, and BT 330.

If the station represents a service consumer station such as the STA 110-A of a TDLS network, the query frame 410 of FIG. 4, which may include the broadcast and unicast query frame described above, may be encapsulated into IEEE 802.11 based data frame and sent to the Wi-Fi interface 310. If the station represents a service provider station such as the STA 110-C of a TDLS network, the service frame 450 of the FIG. 4, which may include the first or the second service frame described above, may be encapsulated into IEEE 802.11 based data frame and sent to the Wi-Fi interface 310.

Figure 5:
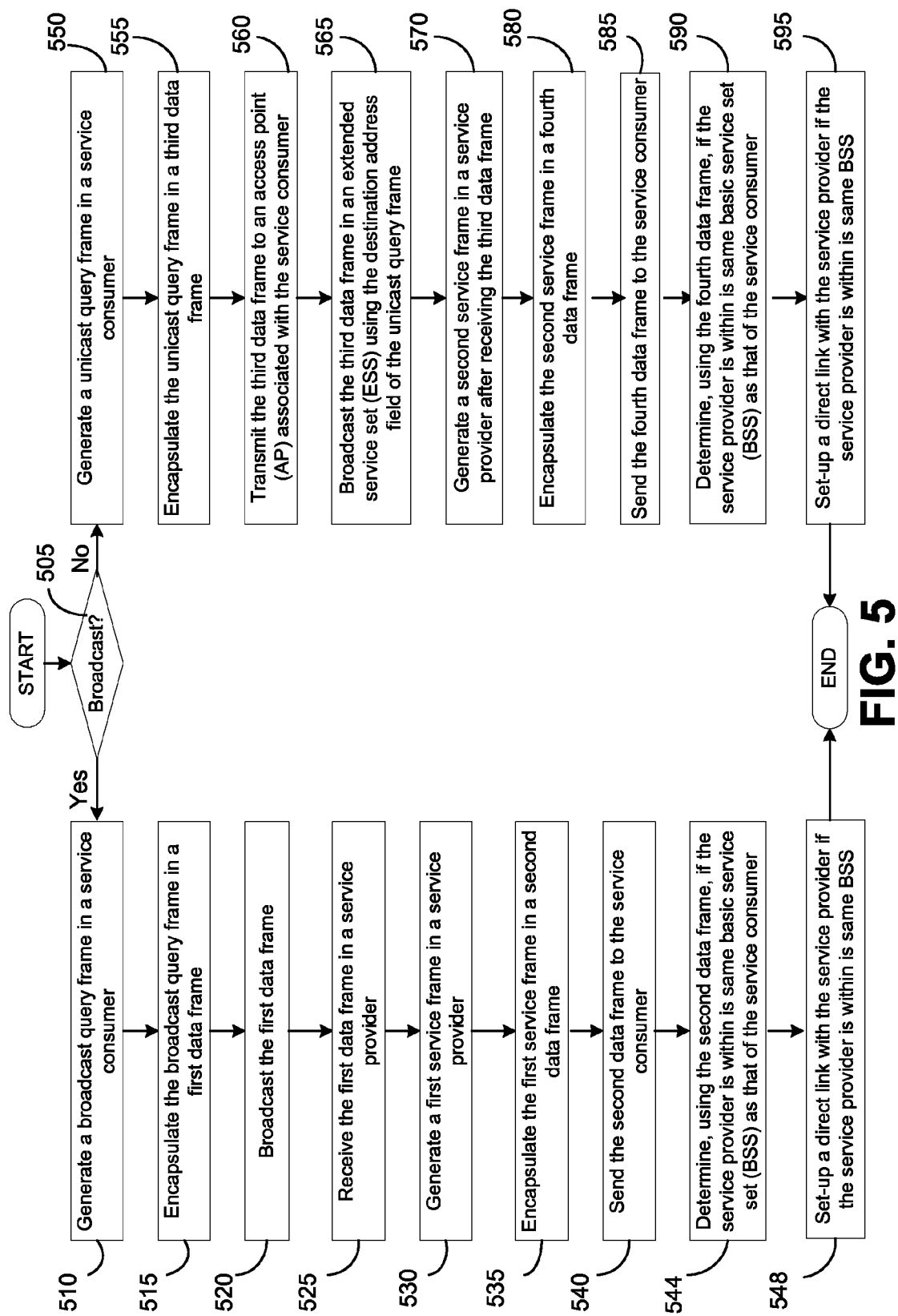
FIG. 5 is a flow-chart, which illustrates combined device and service discovery technique performed by service consumer STA and service provider STA according to one embodiment.

A flow-chart 500 depicting combined device and service discovery technique adopted by the stations of a TDLS network is illustrated in FIG. 5. In block 505, the service consumer station such as STA 110-A may determine whether to send a broadcast query frame or a unicast query frame. In one embodiment, control passes to block 510 if the service consumer station STA 110-A determines to send a broadcast query frame and to block 550 otherwise.

In block 510, the service consumer station STA 110-A may generate a broadcast query frame. In one embodiment, the STA 110-A may use a query frame 600 of FIG. 6 described below to generate the broadcast query frame.

In block 515, the STA 110-A may encapsulate the query frame 600 configured as a broadcast query frame in a first data frame. In one embodiment, the STA 110-A may use IEEE 802.11 based data frame.

In block 520, the STA 110-A may broadcast the first data frame. As the first data frame comprises the query frame 600 configured as a broadcast frame, the AP 130-A may not process the first data frame.

In block 525, service provider stations such as the STA 110-C may receive the first data frame. In block 530, the service provider station STA 110-C may generate a first service frame using the service frame 700 of FIG. 7 described below.

In block 535, the STA 110-C may encapsulate the first service frame in a second data frame. In one embodiment, the second data frame may be based on IEEE 802.11 standards.

In block 540, the STA 110-C may send the second data frame to the service consumer station STA 110-A. In one embodiment, the service provider station STA 110-C may send the second data frame based in the basic service set identifier (BSSID) field of the broadcast query frame.

In block 544, the STA 110-A may determine, using the second data frame, if the service provider station STA 110-C is within the same BSS as that of the STA 110-A. In block 548, the STA 110-A may set-up a direct link with the STA 110-C if the STA 110-C is within the same BSS as that of STA 110-A. In one embodiment, the STA 110-A may use unicast packet transmission using the MAC address and BSSID of the service provider. In other embodiments, the STA 110-A may initiate higher level service discovery procedure.

In block 550, the service consumer station STA 110-A may generate a unicast query frame. In one embodiment, the STA 110-A may use the query frame 600 described below to generate the unicast query frame.

In block 555, the STA 110-A may encapsulate the query frame 600 configured as a unicast query frame in a third data frame. In one embodiment, the STA 110-A may use IEEE 802.11 standards based data frame.

In block 560, the STA 110-A may transmit the third data frame to an access point such as the AP 130-A. As the third data frame comprises the query frame 600 configured as a unicast query frame, the AP 130-A may process the third data frame.

In block 565, the AP 130-A may broadcast the unicast frame using the broadcast address encoded in a destination address field of the unicast query frame. In block 570, the service provider station STA 110-C may generate a second service frame using the service frame 700.

In block 580, the STA 110-C may encapsulate the second service frame in a fourth data frame. In one embodiment, the fourth data frame may be based on IEEE 802.11 standards. In block 585, the STA 110-C may send the fourth data frame to the service consumer station STA 110-A using the destination address field configured to the MAC address of the STA 110-A.

In block 590, the STA 110-A may determine, using the fourth data frame, if the service provider station STA 110-C is within the same BSS as that of the STA 110-A.

In block 595, the STA 110-A may set-up a direct link with the STA 110-C if the STA 110-C is within the same BSS as that of STA 110-A. In one embodiment, the STA 110-A may use unicast packet transmission using the MAC address and BSSID of the service provider. In other embodiment, the STA 110-A may initiate higher level service discovery procedure such as but not limited to UPnP, Zconf.

Figure 6:
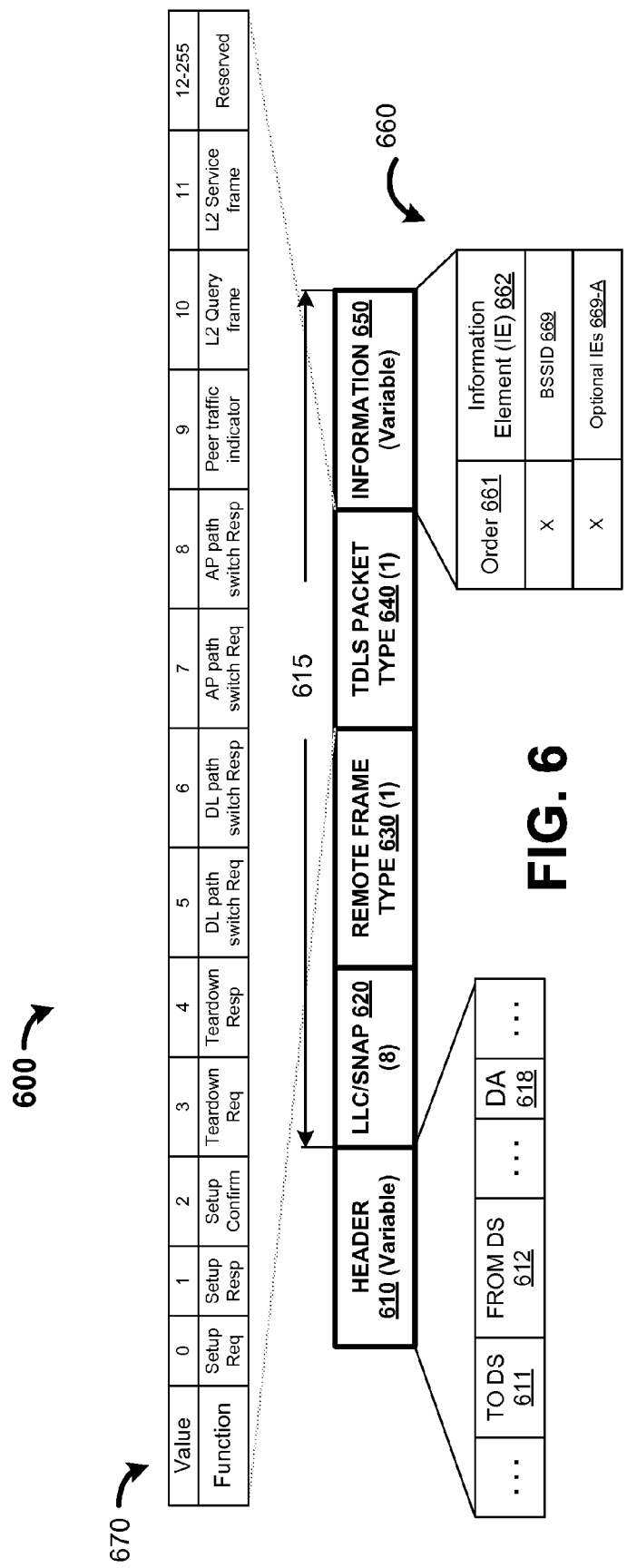
FIG. 6 illustrates a Query frame generated by the service consumer STA according to one embodiment.

An embodiment of a query frame 600 used by the service consumer station is illustrated in FIG. 6. In one embodiment, the query frame 600 may comprise fields such as a header 610 and a frame body 615.

In one embodiment, the header 610 may comprise sub-fields such as TODS 611, FromDS 612, and destination address DA 618 and such other sub-fields. In one embodiment, the frame body 615 may comprise fields comprising LLC/SNAP 620, remote frame type 630, TDLS packet type 640, and Information 650.

In one embodiment, the STA 110-A, while generating a broadcast query frame as indicated in block 510, may configure sub-fields TODS 611 (=0), FromDS 612 (=0), LLC/SNAP 620 (=80 d), Remote frame type 630 (=2), TDLS packet type 640 (=10). In one embodiment, the TDLS packet type 640 may be configured using the values in table 670. In one embodiment, the STA 110-A may use a reserved value 10 to indicate that the TDLS packet type is a layer-2 query frame In one embodiment, the Information 650 may comprise a table 660, which may include columns Order 661 and Information Element (IE) 662 and the IE 662 may comprise BSSID 669. In one embodiment, the IE 662 may also comprise optional IEs 669-A, which may be used by the STA 110-A to indicate the services that the STA 110-A is interested in. In one embodiment, the STA 110-A may configure the BSSID 669 with a basic service set identifier of the AP 130-A to which the service consumer station STA 110-A is associated. In one embodiment, the Information 650 may also comprise optional information elements, which may identify the services that the service consumer station STA 110-A may require.

In one embodiment, the STA 110-A, while generating a unicast query frame as indicated in block 550, may configure sub-fields TODS 611 (=1), FromDS 612 (=0), DA 618 (=Broadcast address), LLC/SNAP 620 (=80 d), Remote frame type 630 (=2), TDLS packet type 640 (=10). In one embodiment, the TDLS packet type 640 may be configured using the values in table 670. In one embodiment, the STA 110-A may use a reserved value 10 to indicate that the TDLS packet type is a layer-2 query frame. In one embodiment, the IE 662 may comprise BSSID 669, which may be configured with a basic service set identifier of the AP 130-A to which the service consumer station STA 110-A is associated. In one embodiment, the Information 650 may also comprise Optional IEs 669-A, which may identify the services that the service consumer station STA 110-A may require.

In one embodiment, the STA 110-A may establish a tunneled direct link set-up with the STA 110-C if the STA 110-A determines that the STA 110-C is also provisioned within the same BSS (120-A, for example) in which the STA 110-A is provisioned. In one embodiment, the STA 110-A may use the value '0' of table 670 to send a set-up request (Setup Req) and may receive a response from the STA 110-C. After receiving a favorable response, the STA 110-A may send a value '2' from the table 670 to confirm the setup (Setup Confirm).

Figure 7:
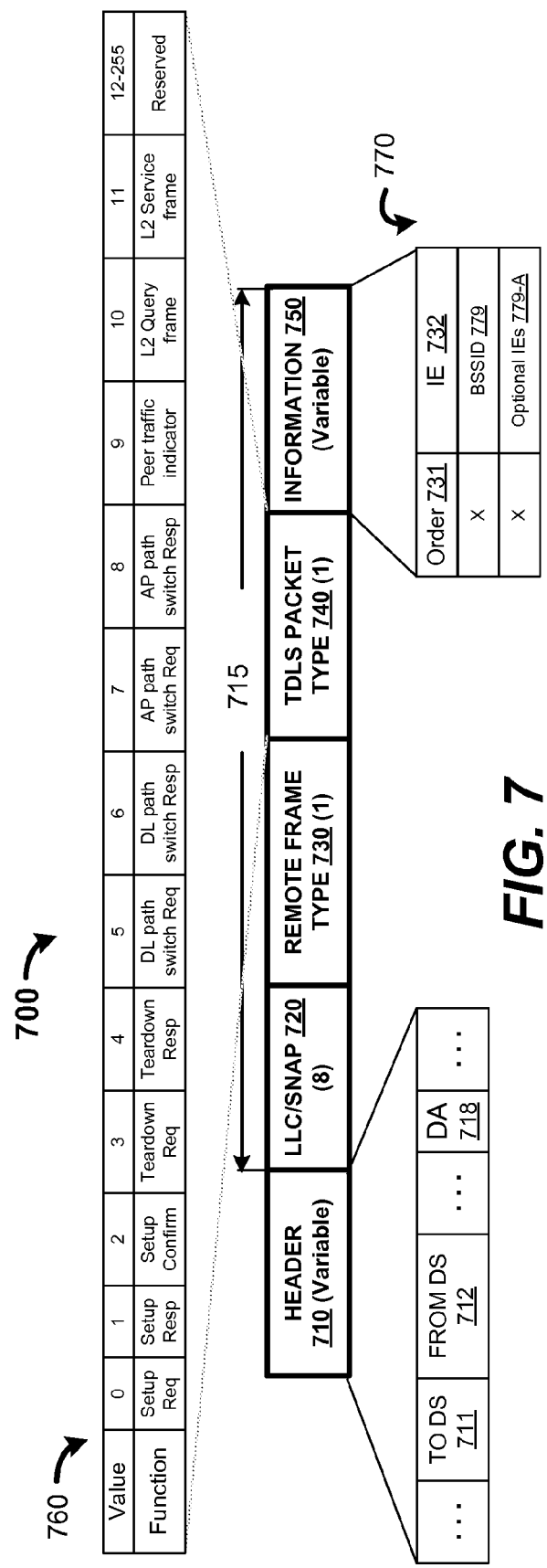
FIG. 7 illustrates a service frame generated by the service provider STA according to one embodiment.

An embodiment of the service frame used by the service provider station STA 110-C is illustrated in FIG. 7. In one embodiment, the service frame 700 may be substantially similar to the query frame 600 of FIG. 6. In one embodiment, the STA 110-C, while generating a first service frame, in response to receiving the broadcast query frame as indicated in block 530, may configure sub-fields TODS 711 (=0), FromDS 712 (=0), LLC/SNAP 720 (=80 d), Remote frame type 730 (=2), TDLS packet type 740 (=11). In one embodiment, the TDLS packet type 740 may be configured using the reserved values in table 760. In one embodiment, the STA 110-C may use a reserved value 11 to indicate that the TDLS packet type is a service frame.

In one embodiment, the Information 750 may comprise a table 770, which may include columns Order 761 and Information Element (IE) 762 and the IE 762 may comprise BSSID 779. In one embodiment, the IE 762 may also comprise optional IEs 779-A, which may be used by the STA 110-C to indicate the services that the STA 110-C is capable of supporting. In one embodiment, the STA 110-C may configure the BSSID 779 with a basic service set identifier of the AP 130-A to which the service consumer station STA 110-C is associated. In one embodiment, the STA 110-A may receive the first service frame and examine the contents of the BSSID 779 to determine the location of the service provider station. In one embodiment, the service consumer station 110-A may thus discover the device and the services offered by the device using layer-2 combined device and service discovery procedure.

In one embodiment, the STA 110-C, while generating a second service frame, in response to receiving the unicast query frame indicated in block 570, may configure sub-fields ToDS 711 (=0), FromDS 712 (=0), DA 718 (=MAC address of STA 110-A), LLC/SNAP 720 (=80d), Remote frame type 730 (=2), TDLS packet type 740 (=11). In one embodiment, the TDLS packet type 740 may be configured using the reserved values in table 760. In one embodiment, the STA 110-C may use a reserved value 11 to indicate that the TDLS packet type is a service frame.

In one embodiment, the Information 750 may comprise a table 770, which may include columns Order 761 and Information Element (IE) 762 and the IE 762 may comprise BSSID 779. In one embodiment, the IE 762 may also comprise optional IEs 779-A, which may be used by the STA 110-C to indicate the services that the STA 110-C is capable of supporting. In one embodiment, the STA 110-C may configure the BSSID 779 with a basic service set identifier of the AP 130-A to which the service consumer station STA 110-C is associated. In one embodiment, the STA 110-A may receive the first service frame and examine the contents of the BSSID 779 to discover the presence of the service provider station and the location of the service provider station.

In one embodiment, the Optional IEs 779-A may also include the status code such as 'Success', 'Service Not found', and 'Malformed Query'. In one embodiment, the service consumer station 110-A may thus discover the device and the services offered by the device using layer-2 combined device and service discovery procedure. In one embodiment, while setting up a tunneled direct link, the STA 110-C may receive a set-up request from the STA 110-A and may respond by selecting a value of '1' (Setup Resp) from the table 760.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method in a wireless network supporting tunneled direct link set-up comprising:
    sending a layer-2 query frame from a service consumer station,
    generating a layer-2 service frame in response to receiving the layer-2 query frame in a service provider station, wherein a plurality of stations include the service consumer station and the service provider station,
    discovering the service provider station and services offered by the service provider station in response to receiving the layer-2 service frame in the service consumer station; and
    using the layer-2 query frame to discover the service provider station, and layer-3 service procedure to discover the services offered by the service provider station;
    wherein the layer-2 query frame is a unicast query frame, wherein a router is to rebroadcast the unicast query frame using a broadcast address of the unicast query frame;
    wherein the layer-2 service frame includes a response service frame generated by the service provider station in response to receiving the unicast query frame,
    wherein the response service frame is to include a basic service set identifier value, information elements, and a destination address comprising a medium access control address value of the service consumer station,
    wherein the basic service set identifier value is to identify a basic service set within which the service provider station is provisioned, and
    wherein the information elements is to indicate the services offered by the service provider station.

2. The method of claim 1, wherein the response service frame is directed to the service consumer station using the medium access control address value of the response service frame.

3. The method of claim 1 comprises attaching the basic service set identifier value and the medium access control address value determined using the response service frame to a layer-3 query frame.

4. The method of claim 3 comprises establishing a tunneled direct link set-up with the service provider station if the basic service identifier value indicates that the service provider station is within a basic service set in which the service consumer station is provisioned.

5. A method in a wireless network supporting tunneled direct link set-up comprising:
    sending a layer-2 query frame from a service consumer station,
    generating a layer-2 service frame in response to receiving the layer-2 query frame in a service provider station, wherein a plurality of stations include the service consumer station and the service provider station,
    discovering the service provider station and services offered by the service provider station in response to receiving the layer-2 service frame in the service consumer station; and
    using the layer-2 query frame to discover the service provider station, and layer-3 service procedure to discover the services offered by the service provider station;
    wherein the layer-2 query frame is a broadcast query frame, wherein the broadcast query frame is configured to avoid a router from processing the broadcast query frame, wherein the service consumer station and the service provider station are coupled to the router,
    wherein the layer-2 service frame includes a response service frame generated by the service provider station in response to receiving the broadcast query frame,
    wherein the response service frame is to include a basic service set identifier value and information elements,
    wherein the basic service set identifier value is to identify a basic service set within which the service provider station is provisioned, and
    wherein the information elements is to indicate the services offered by the service provider station.

6. The method of claim 5, wherein discovering the service provider station in the service consumer station includes,
    retrieving the basic service set identifier value and the information elements from the response service frame, and
    determining that the service provider station is provisioned in a basic service set of the service consumer station if the basic service set identifier value is same as the basic service set of the service consumer station.

7. The method of claim 6 comprises establishing a tunneled direct link set-up with the service provider station if the basic service identifier value indicates that the service provider station is within the basic service set in which the service consumer station is provisioned, wherein the service consumer station is to initiate establishing the tunneled direct link set-up.

8. A system supporting tunneled direct link set-up comprising:
a plurality of stations comprising a first station and a second station, and a first router coupled to the first station and the second station,
wherein the first station is a service consumer station and the second station is a service provider station,
wherein the first station is to send a layer-2 query frame to the plurality of stations,
wherein the second station is to generate a layer-2 service frame in response to receiving the layer-2 query frame, and
wherein the first station is to discover the second station and the services offered by the second station based on the layer-2 service frame;
wherein the layer-2 query frame is a unicast query frame, wherein the first router is to rebroadcast the unicast frame using a broadcast address of the unicast query frame;
wherein the layer-2 service frame is a response service frame generated by the second station in response to receiving the unicast query frame,
wherein the response service frame is to include a basic service set identifier value, information elements, and a destination address comprising a medium access control address value of the first station,
wherein the basic service set identifier value is to identify a basic service set within which the second station is provisioned,
wherein the information elements is to indicate the services offered by the second station, and
wherein the first station is to discover the second station using the layer-2 query frame, and the services offered by the second station using a layer-3 service procedure.

9. The system of claim 8, wherein the response service frame is directed to the first station using the medium access control address value of the response service frame.

10. The system of claim 8, wherein the first station is to attach the basic service identifier value and the medium access control address value determined using the response service frame to a layer-3 query frame.

11. The system of claim 10, wherein the first station is to establish a tunneled direct link set-up with the second station if the basic service identifier value indicates that the second station is within a basic service set in which the first service station is provisioned.

12. A system supporting tunneled direct link set-up comprising:
a plurality of stations comprising a first station and a second station, and a first router coupled to the first station and the second station,
wherein the first station is a service consumer station and the second station is a service provider station,
wherein the first station is to send a layer-2 query frame to the plurality of stations,
wherein the second station is to generate a layer-2 service frame in response to receiving the layer-2 query frame, and
wherein the first station is to discover the second station and the services offered by the second station based on the layer-2 service frame;
wherein the layer-2 query frame is a broadcast query frame, wherein the broadcast query frame is configured to avoid the first router from processing the broadcast query frame,
wherein the layer-2 service frame is a response service frame generated by the second station in response to receiving the broadcast query frame,
wherein the response service frame is to include a basic service set identifier value and information elements,
wherein the basic service set identifier value is to identify a basic service set within which the second station is provisioned,
wherein the information elements is to indicate the services offered by the second station, and
wherein the first station is to discover the second station using the layer-2 query frame, and the services offered by the second station using a layer-3 service procedure.

13. The system of claim 12, wherein the first station is to discover, the second station from the basic service set identifier value of the response service frame, and the services offered by the second station from the information elements of the response service frame.

14. The system of claim 13, wherein the first station is to establish a tunneled direct link set-up with the second station if the basic service identifier value indicates that the second station is within a basic service set in which the first service station is provisioned.

* * * * *

UNITED STATES PATENT AND TRADEMARK OFFICE
CERTIFICATE OF CORRECTION

| | | |
|---|---|---|
| PATENT NO. | : 8,243,623 B2 | Page 1 of 1 |
| APPLICATION NO. | : 12/415636 | |
| DATED | : August 14, 2012 | |
| INVENTOR(S) | : Xiaohong Gong et al. | |

It is certified that error appears in the above-identified patent and that said Letters Patent is hereby corrected as shown below:

In column 11, line 18, in claim 8, delete "and the" and insert -- and --.

Signed and Sealed this
Eighteenth Day of December, 2012

David J. Kappos
*Director of the United States Patent and Trademark Office*